United States Patent
Kim et al.

(10) Patent No.: US 12,000,963 B2
(45) Date of Patent: Jun. 4, 2024

(54) LiDAR DEVICE AND METHOD OF OPERATING THE SAME

(71) Applicant: SAMSUNG ELECTRONICS CO., LTD., Suwon-si (KR)

(72) Inventors: Jungwoo Kim, Hwaseong-si (KR); Tatsuhiro Otsuka, Suwon-si (KR); Yongchul Cho, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 415 days.

(21) Appl. No.: 16/921,427

(22) Filed: Jul. 6, 2020

(65) Prior Publication Data

US 2021/0208258 A1    Jul. 8, 2021

(30) Foreign Application Priority Data

Jan. 7, 2020    (KR) .................. 10-2020-0002144

(51) Int. Cl.
  *G01S 7/48*      (2006.01)
  *G01S 7/481*     (2006.01)
  (Continued)

(52) U.S. Cl.
  CPC .......... *G01S 7/4865* (2013.01); *G01S 7/4815* (2013.01); *G01S 7/4816* (2013.01); *G01S 7/4817* (2013.01); *G01S 17/10* (2013.01)

(58) Field of Classification Search
  USPC ....................................................... 356/5.01
  See application file for complete search history.

(56) References Cited

U.S. PATENT DOCUMENTS 6,301,003 B1    10/2001    Shirai et al.
9,350,980 B2 *  5/2016    Robinson ............. G02B 6/0068
(Continued)

FOREIGN PATENT DOCUMENTS

JP    2006-242572 A       9/2006
JP    2011023065 A  *    2/2011
(Continued)

OTHER PUBLICATIONS

English Machine Translation of JP-2011023065-A (19 pages) (Year: 2011).*

(Continued)

*Primary Examiner* — James R Hulka
(74) *Attorney, Agent, or Firm* — Sughrue Mion, PLLC

(57) ABSTRACT

Provided is a light detection and ranging (LiDAR) device including a light transmitter including a plurality of light sources, each of the plurality of light sources being configured to emit light toward an object, a light receiver including a plurality of light detection elements, each of the plurality of light detection elements being configured to detect reflected light reflected from the object that is irradiated with the light emitted by the plurality of light sources, and the light receiver being configured to remove crosstalk from second detection information output by at least one light detection element of the plurality of light detection elements based on first detection information output by any one of remaining light detection elements of the plurality of light detection elements, and a processor configured to obtain information on the object based on the second detection information with the crosstalk removed.

13 Claims, 20 Drawing Sheets

(51) Int. Cl.
  *G01S 7/4865* (2020.01)
  *G01S 17/10* (2020.01)

(56) References Cited

U.S. PATENT DOCUMENTS

| | | | | |
|---|---|---|---|---|
| 10,063,849 | B2* | 8/2018 | Pacala | G02B 3/0056 |
| 10,106,344 | B2 | 10/2018 | Yamaguchi | |
| 10,222,475 | B2* | 3/2019 | Pacala | G01S 17/42 |
| 10,969,651 | B2* | 4/2021 | Seliuchenko | G01S 17/42 |
| 11,016,193 | B2* | 5/2021 | Pacala | G01S 7/4817 |
| 11,221,410 | B2* | 1/2022 | Ikuta | G01S 17/10 |
| 2007/0024840 | A1* | 2/2007 | Fetzer | G01S 7/4811 |
| | | | | 382/106 |
| 2012/0148257 | A1* | 6/2012 | Hwang | H04B 10/40 |
| | | | | 398/139 |
| 2013/0307946 | A1* | 11/2013 | Robinson | G02B 6/0048 |
| | | | | 348/55 |
| 2015/0131080 | A1* | 5/2015 | Retterath | G01S 17/10 |
| | | | | 356/5.01 |
| 2017/0024658 | A1* | 1/2017 | Utsunomiya | G01R 33/1284 |
| 2018/0074196 | A1 | 3/2018 | Weinberg | |
| 2018/0118478 | A1* | 5/2018 | Yamaguchi | G03G 15/6502 |
| 2018/0167602 | A1 | 6/2018 | Pacala et al. | |
| 2018/0210086 | A1 | 7/2018 | Seliuchenko et al. | |
| 2018/0329065 | A1* | 11/2018 | Younge | G02B 27/0955 |
| 2019/0011556 | A1* | 1/2019 | Pacala | G01S 7/497 |
| 2019/0011561 | A1* | 1/2019 | Pacala | G01S 7/4815 |
| 2019/0011562 | A1* | 1/2019 | Pacala | G01S 17/08 |
| 2019/0064355 | A1 | 2/2019 | Pacala et al. | |
| 2019/0129009 | A1 | 5/2019 | Eichenholz et al. | |
| 2020/0191958 | A1 | 6/2020 | Ikuta et al. | |
| 2020/0225325 | A1 | 7/2020 | Kim et al. | |

FOREIGN PATENT DOCUMENTS

| | | | |
|---|---|---|---|
| JP | 2016142820 A | * | 8/2016 |
| JP | 2018-70326 A | | 5/2018 |
| KR | 10-2019-0005226 A | | 1/2019 |
| KR | 1020200088654 A | | 7/2020 |
| WO | 2015/126471 A2 | | 8/2015 |
| WO | 2018/211762 A1 | | 11/2018 |

OTHER PUBLICATIONS

Communication issued Jan. 22, 2021 by the European Patent Office in European Patent Application No. 20188143.0.

* cited by examiner

LiDAR DEVICE AND METHOD OF OPERATING THE SAME

CROSS-REFERENCE TO RELATED APPLICATION

This application claims priority from Korean Patent Application No. 10-2020-0002144, filed on Jan. 7, 2020 in the Korean Intellectual Property Office, the disclosure of which is incorporated herein in its entirety by reference.

BACKGROUND

1. Field

Example embodiments of the present disclosure relate to a LiDAR device and a method of operating the same.

2. Description of Related Art

Light Detection and Ranging (LiDAR) systems are used in a variety of applications, such as aerospace, geology, three-dimensional maps, automobiles, robots, and drones.

LiDAR devices use the time of flight (ToF) of light as the basic operation principle. For example, a LiDAR device may transmit light toward an object, receive the light through a sensor, and measure the ToF using a high speed electric circuit. In addition, LiDAR devices may calculate a distance to an object by using the ToF and generate a depth image of the object by using the distance calculated for each position of the object.

In addition, in order to achieve high image resolution within a given frame time, LiDAR devices may include a plurality of light sources and a plurality of light detection elements for receiving light emitted from the plurality of light sources. However, in this case, as one of the light detection elements receives the light emitted from the two light sources, an error of the ToF calculation may occur.

Therefore, there is a need for a technique for distinguishing a received signal from detection information outputted by the light detection element and removing crosstalk.

SUMMARY

One or more example embodiments provide LiDAR devices capable of removing crosstalk and methods of operating the same.

Additional aspects will be set forth in part in the description which follows and, in part, will be apparent from the description, or may be learned by practice of the presented embodiments of the disclosure.

According to an aspect of an example embodiment, there is provided a light detection and ranging (LiDAR) device including a light transmitter including a plurality of light sources, each of the plurality of light sources being configured to emit light toward an object, a light receiver including a plurality of light detection elements, each of the plurality of light detection elements being configured to detect reflected light reflected from the object that is irradiated with the light emitted by the plurality of light sources, and the light receiver being configured to remove crosstalk from second detection information output by at least one light detection element of the plurality of light detection elements based on first detection information output by any one of remaining light detection elements of the plurality of light detection elements, and a processor configured to obtain information on the object based on the second detection information with the crosstalk removed.

The light receiver may include a first light detection element configured to receive a first reflected light reflected from the object that is irradiated with a first light emitted by a first light source among the plurality of light sources through a first path, and to output the first detection information corresponding to the first reflected light, and a second light detection element configured to receive a second reflected light reflected from the object that is irradiated with a second light emitted by a second light source among the plurality of light sources, the second light source being different from the first light source through a second path, wherein the crosstalk is generated based on the second light detection element further receiving the first reflected light through a third path that is different from the first path, and wherein the second light detection element outputs the second detection information corresponding to the first reflected light and the second detection information corresponding to the second reflected light based on the crosstalk being generated.

The light receiver may further include a first detection signal converter configured to convert the first detection information output by the first light detection element into a first pulse signal, and a second detection signal converter configured to convert the second detection information output by the second light detection element into a second pulse signal.

The light receiver may be configured to determine, as a removal start time point of the crosstalk, an earlier time point among a first reception time point of the first reflected light detected by the first light detection element and a second reception time point of the first reflected light detected by the second light detection element, and the light receiver may further include a crosstalk removing element configured to remove a pulse located within a predetermined masking pulse width from the removal start time point among pulses included in the second pulse signal.

The predetermined masking pulse width may be set to be larger than a pulse width of the first reflected light.

The light transmitter may further include a beam steering element configured to adjust an emission direction of light emitted by each of the plurality of light sources to scan the object.

The beam steering element may be configured to control the emission direction of the light emitted by each of the plurality of light sources by mechanical rotation.

The light receiver may include a plurality of counters configured to count a time of flight of light detected by each of the plurality of light detection elements.

The processor may be further configured to obtain a distance to the object based on a time of flight of light detected by each of the plurality of light detection elements, and analyze a position of the object and a shape of the object.

According to another aspect of an example embodiment, there is provided a method of operating a light detection and ranging (LiDAR) device, the method including emitting, from a plurality of light sources, light toward an object, detecting, by a plurality of light detection elements, reflected light reflected from the object that is irradiated with the light emitted by the plurality of light sources, removing crosstalk from second detection information output by at least one light detection element of the plurality of light detection elements based on first detection information output by any one of remaining light detection elements of the plurality of light detection elements, and obtaining information on the object based on the second detection information with the crosstalk removed.

The detecting of the reflected light may include receiving, by a first light detection element, a first reflected light reflected from the object that is irradiated with a first light emitted by a first light source among the plurality of light sources through a first path and outputting, by the first light detection element, the first detection information corresponding to the first reflected light, and receiving, by a second light detection element, a second reflected light reflected from the object that is irradiated with a second light emitted by a second light source among the plurality of light sources through a second path, the second light source being different from the first light source, wherein the crosstalk may be generated based on the second light detection element further receiving the first reflected light through a third path that is different from the first path, and wherein the method may further include, outputting, by the second light detection element, the second detection information corresponding to the first reflected light and the second detection information corresponding to the second reflected light based on the crosstalk being generated.

The detecting of the reflected light may further include converting the first detection information output by the first reflected light detection element into a first pulse signal, and converting the second detection information output by the second reflected light detection element into a second pulse signal.

The removing of the crosstalk may include determining as a removal start time point of the crosstalk, an earlier time point among a first reception time point of the first reflected light detected by the first light detection element and a second reception time point of the first reflected light detected by the second light detection element, and removing a pulse located within a predetermined masking pulse width from the removal start time point among pulses included in the second pulse signal.

The predetermined masking pulse width may be set to be larger than a pulse width of the first reflected light and a pulse width of the second reflected light, respectively.

The obtaining of the information may include counting a time of flight of light detected by each of the plurality of light detection elements.

The obtaining of the information may further include obtaining a distance to the object based on the time of flight, and analyzing a position of the object and a shape of the object.

The method may further include adjusting emission direction of light generated by each of the plurality of light sources to scan the object.

The emission direction of the light emitted by the plurality of light sources may be adjusted based on a mechanical rotation.

According to yet another aspect of an example embodiment, there is provided a light detection and ranging (LiDAR) device including a light transmitting device including a first light source that is configured to emit a first light toward an object, and a second light source that is configured to emit a second light toward the object, a light receiving device including a first light detection element configured to detect a first reflected light reflected from the object that is irradiated with the first light through a first path, and output a first detection information corresponding to the first reflected light, a second light detection element configured to detect at least a second reflected light reflected from the object that is irradiated with the second light through a second path, and output a second detection information corresponding to at least the second reflected light, a first detection signal converter configured to convert the first detection information output by the first light detection element into a first pulse signal, and a second detection signal converter configured to convert the second detection information output by the second light detection element into a second pulse signal, and a processor configured to obtain information on the object based on the second detection information with a crosstalk removed, wherein the crosstalk is generated based on the second light detection element further receiving the first reflected light reflected from the object that is irradiated with the first light through a third path that is different from the first path.

The light receiving device may be configured to determine, as a removal start time point of the crosstalk, an earlier time point among a first reception time point of the first reflected light detected by the first light detection element and a second reception time point of the first reflected light detected by the second light detection element, and wherein the light receiving device may further include the crosstalk removing element configured to remove a pulse located within a predetermined masking pulse width from the removal start time point among pulses included in the second pulse signal

BRIEF DESCRIPTION OF THE DRAWINGS

The above and/or other aspects, features, and advantages of certain example embodiments will be more apparent from the following description taken in conjunction with the accompanying drawings, in which.

DETAILED DESCRIPTION

Figure 1:
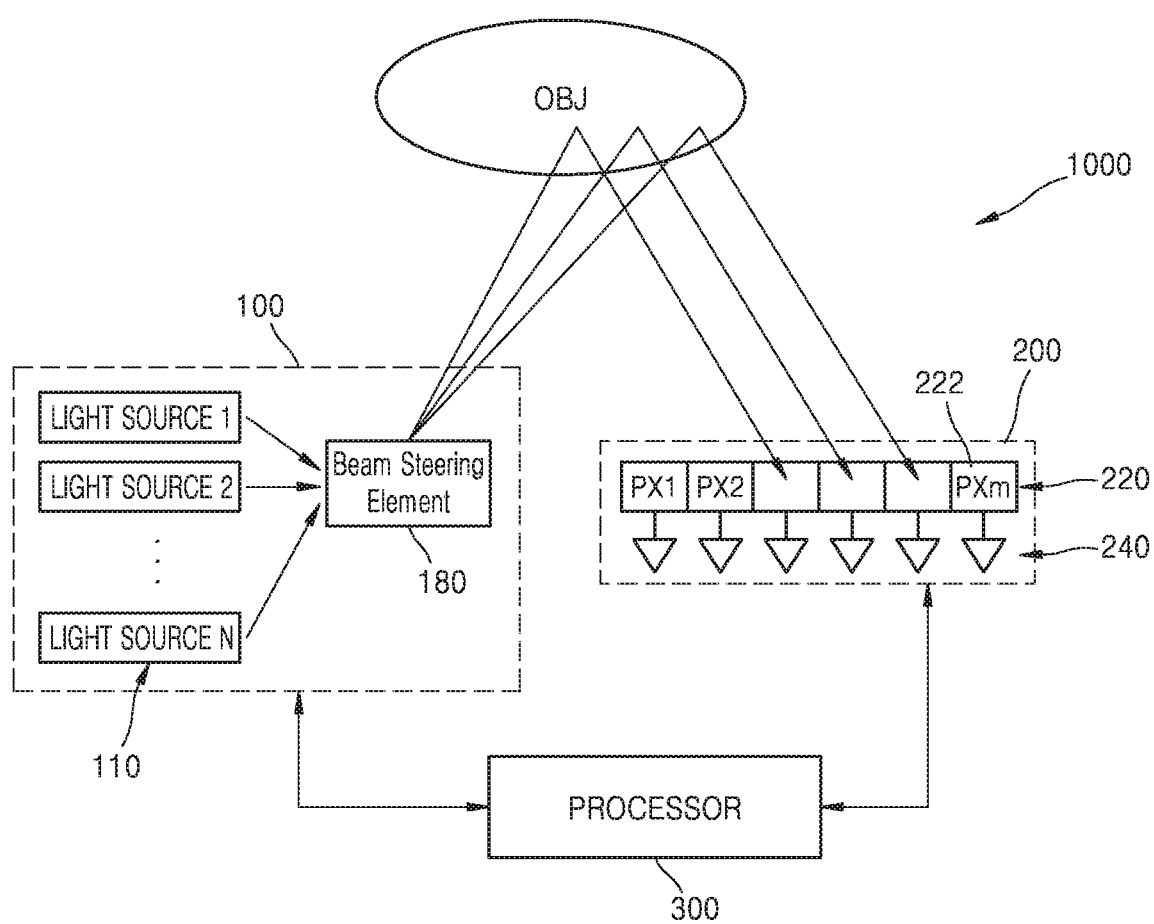
FIG. 1 illustrates a configuration of a LiDAR device according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein.

Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The phrases "in some example embodiments" or "in an example embodiment" appearing in various places in the specification are not necessarily all referring to the same example embodiment.

Some example embodiments may be represented by functional block configurations and various processing steps. Some or all of these functional blocks may be implemented in various numbers of hardware and/or software configurations that perform particular functions. For example, the functional blocks according to example embodiments may be implemented by one or more microprocessors or by circuit configurations for a given function. In addition, for example, the functional blocks according to example embodiments may be implemented in various programming or scripting languages. Functional blocks may be implemented in algorithms executed on one or more processors. In addition, the present disclosure may employ the related art for electronic configuration, signal processing, and/or data processing. Terms such as "mechanism", "element", "means", and "configuration" can be used broadly and are not limited to mechanical and physical configurations.

In addition, the connection lines or connection members between the components shown in the drawings are merely illustrative of functional connections and/or physical or circuit connections. In a practical device, the connections between the components may be represented by various functional connections, physical connections, or circuit connections that may be replaced or added.

FIG. 1 is a block diagram illustrating a configuration of a LiDAR device according to an example embodiment.

Referring to FIG. 1, a LiDAR device 1000 may include a light transmitter 100 that emits and scans light onto an object OBJ, a light receiver (light receiving device) 200 that detects light that is reflected from the object OBJ that is irradiated with light emitted from the light transmitter (light transmitting device) 100, and a processor 300 that controls the light receiver 200. It will be apparent to those skilled in the art that the LiDAR device 1000 may further include other general purpose components in addition to the components shown in FIG. 1.

The light transmitter 100 may include a light source assembly 110 including a plurality of light sources (light source 1, light source 2, . . . light source N) and a beam steering device 180.

In an example embodiment, the placement and driving of the light source assembly 110 and the beam steering element 180 may be defined such that the light from each of the plurality of light sources scans the object OBJ at different emission angles through the beam steering element 180. In another example embodiment, the placement and driving of the light source assembly 110 and the beam steering element 180 may be defined such that the light from each of the plurality of light sources scans the object OBJ at the same emission angle through the beam steering element 180.

The light sources of the light source assembly 110 may emit light to be used in analyzing the position and shape of the object OBJ. The light source assembly 110 generates and emits light having a predetermined wavelength and emits light of a wavelength band suitable for analyzing the position and shape of the object OBJ, for example, light of an infrared band wavelength. If light in the infrared band is used, mixing with natural light in the visible region, including sunlight, may be prevented. However, embodiments are not limited to the infrared band, and the light source assembly 110 may emit light of various wavelength bands.

The light source assembly 110 may include a light source such as a laser diode (LD), edge emitting laser, vertical-cavity surface emitting laser (VCSEL), distributed feedback laser, a light emitting diode (LED), and a super luminescent diode (SLD). The light source assembly 110 may generate and emit light of a plurality of different wavelength bands. The light source assembly 110 may generate and emit pulsed light or continuous light.

The light sources of the light source assembly 110 may emit light toward the object OBJ under the control of the processor 300. For example, the processor 300 may set the emission direction or emission angle of the light from each light source and control the light source assembly 110 such that the plurality of light sources emit the light according to each set emission angle or direction.

The beam steering element 180 steers the light emitted from the light source assembly 110 toward the object OBJ, and the steering direction is adjusted sequentially such that point light emitted from the light source assembly 110 scans the entire object OBJ. As the beam steering element 180, a scanning mirror or an optical phased array may be used.

The light receiver 200 classifies the reflected light from the object OBJ according to the position of the reflected light such that the light receiver 200 may include a plurality of pixelated areas that may detect light.

As shown in FIG. 1, the light receiver 200 may include a detector array 220 partitioned into a plurality of pixels PX1, PX2, . . . , PXm. A light detection element 222 may be disposed in each of the plurality of pixels PX1, PX2, . . . , PXm. For example, the light detection elements 222 form the pixels PX1, PX2, . . . , PXm, which are classified according to positions in the detector array 220, and each of the pixels PX1, PX2, . . . , PXm may separately detect the reflected light from the object OBJ separately from the light emitted from the light source assembly 110.

The light receiver 200 may include a circuit unit 240 that may measure the ToF of each light detected at each of the plurality of light detection elements 222, and may further include an optical element for collecting light from the object OBJ into a predetermined pixel.

The plurality of light detection elements 222 may be a sensor capable of sensing light and may be, for example, a light receiving element that generates an electrical signal based on the energy of the sensed light. The type of light receiving element is not specifically limited.

The LiDAR device 1000 according to the example embodiment uses a point scanning method as described above, and thus, the intensity of light received by the light detection element 222 may be lower than other schemes, for example a flash scheme. Accordingly, as the light detection element 222, an avalanche photo diode (APD) or a single photon avalanche diode (SPAD) having high sensing sensitivity may be employed. The specific circuit configuration of an analog front end (AFE), a time to digital converter (TDC), etc. may vary depending on which light receiving element 222 of the light receiver 200 includes an APD or a SPAD.

The processor 300 may perform signal processing for obtaining information on the object OBJ using the light detected by the light receiver 200. For example, the processor 300 may determine a distance to each position of the object OBJ based on the ToF of the light reflected from the object OBJ and perform data processing for analyzing the position and shape of the object OBJ.

Information analyzed by the processor 300, that is, information on a shape and a location of the object OBJ, may be transmitted to another component or device and used. For example, such information may be transmitted to a controller of an autonomous driving device such as a driverless vehicle or a drone in which the LiDAR device 1000 is employed. In addition, such information may be utilized in smartphones, mobile phones, personal digital assistants, laptops, personal computers (PCs), various wearable devices, and other mobile or non-mobile computing devices.

The processor 300 may also control the overall operation of the LiDAR device 1000, including control of the light transmitter 100 and the light receiver 200. The processor 300 may partition an area of the object OBJ considering the number of light sources included in the light source assembly 110, generate a control signal for the beam steering element 180 to scan all of the partitioned areas by the beam steering element 180, and apply the control signal to the beam steering element 180.

In addition, the processor 300 may control the operations of the light source assembly 110 and the light receiver 200. For example, the processor 300 may perform power supply control, on/off control, pulse wave (PW) or continuous wave (CW) generation control, or the like for the light source assembly 110. In addition, the processor 300 may apply a control signal to each of the light detection elements 222 of the light receiver 200.

In an example embodiment, the processor 300 may group the light detection elements 222 into a plurality of groups, and the light receiver 200 may classify and detect the light emitted from the light source assembly 110 for each group.

The processor 300 may set the number of light detection elements 222 included in each group based on the surrounding environment. For example, when the ambient illuminance of the light receiver 200 is a first illuminance, the processor 300 may group each group to include a first number of light detection elements 222, and when the ambient illuminance of the light receiver 200 is a second illuminance that is less than the first illuminance, the processor 300 may group each group to include a second number of light detection elements 222, the second number being greater than the first number. The light detection elements 222 may overlap and output detection signals for each group, and the processor 300 may classify and detect the light emitted from the light source assembly 110 for each group.

The LiDAR device 1000 may also include a memory in which a program and other data for an operation performed by the processor 300 are stored.

The memory is hardware that stores various data processed by the LiDAR device 1000. For example, the memory may store data processed by the LiDAR device 1000 and data to be processed. Also, the memory may store applications, drivers, and the like to be driven by the LiDAR device 1000.

The memory includes random access memory (RAM), such as dynamic random access memory (DRAM), static random access memory (SRAM), and the like, read-only memory (ROM), electrically erasable programmable read-only memory (EEPROM), a CD-ROM, a Blu-ray disk, or other optical disk storage, a hard disk drive (HDD), a solid state drive (SSD), or flash memory, and furthermore, may include other external storage devices that may be accessed by the LiDAR device 1000.

Figure 2:
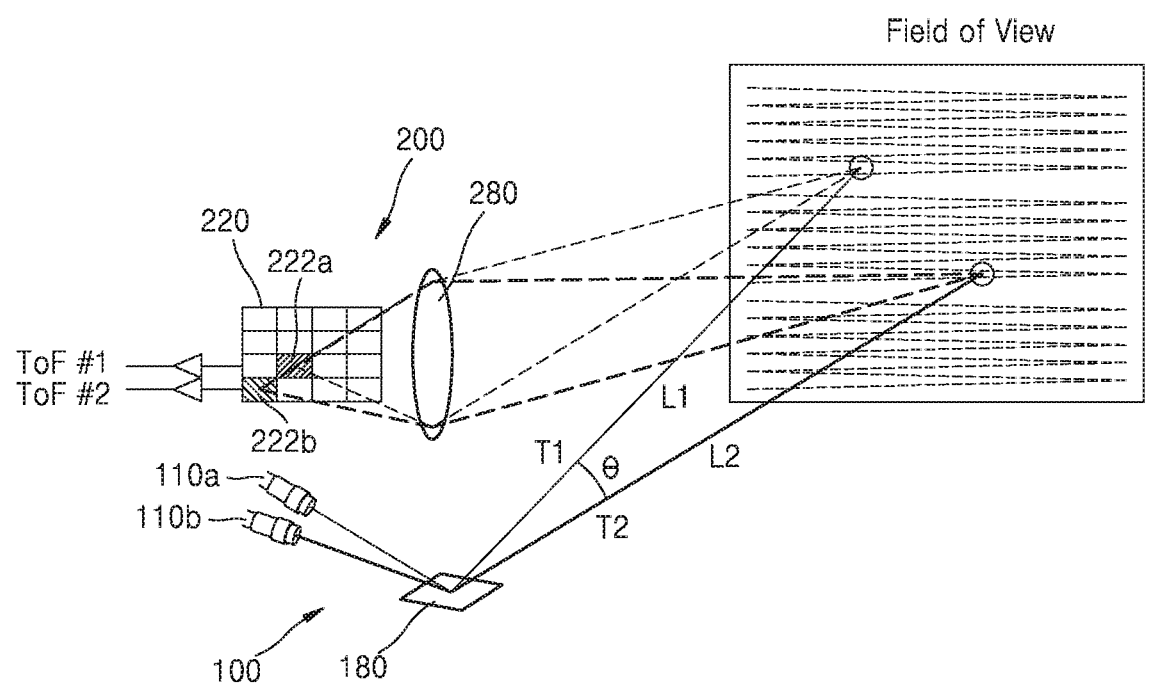
FIG. 2 illustrates an exemplary arrangement and operation of a light transmitter and a light receiver of a LiDAR device according to an example embodiment.

FIG. 2 illustrates an exemplary arrangement and operation of a light transmitter and a light receiver of a LiDAR device according to an example embodiment.

Referring to FIG. 2, the LiDAR device 1000 according to the example embodiment employs a light transmitter 100 using a point scanning method of scanning point light onto an object OBJ such that the LiDAR device 1000 may scan the entire area of the object OBJ through the plurality of light sources.

For example, as shown in FIG. 2, a first light source 110*a* and a second light source 110*b* emit light to the beam steering element 180 at different angles, and have an angle θ between two radiation lines L1 and L2 that are steered by the beam steering element 180. The angle θ is sufficient to be an angle where the light may be detected by distinguishing the reflected light from the object OBJ in different pixels included in a detector array 220. This angle may be determined according to the resolution of the detector array 220 constituting the light receiver 200 and the performance of additional optical elements included in the light receiver 200. For example, this angle θ may be about 1° or more.

The time T1 for radiating light from the first light source 110*a* and the time T2 for the second light source 110*b* may be the same, however, embodiments are not limited thereto, and T1 and T2 may differ. The time difference between T1 and T2 may be, for example, within 1 μs.

Each of the radiation lines L1 and L2 is oriented according to the driving of the beam steering element 180 and scans the entire field of view (FOV) range including the object. The light from the object may be directed to different pixels of the detector array 220, and as illustrated, a lens 280 may be further provided to focus the light onto the pixels of the detector array 220.

Each of the pixels of the detector array 220 is connected to circuit elements for ToF calculations, and values of the first ToF ToF #1 and the second ToF ToF #2 may be derived through a predetermined calculation.

The LiDAR device 1000 according to the example embodiment uses a point scanning method for scanning the point light onto the object OBJ by the light transmitter 100 and has a resolution limit according to the speed limit of the light. For example, the number of pieces of information, for example, point clouds, that may be obtained for the object OBJ within a given frame time, that is, a given reference time for forming an image of one frame with respect to the object OBJ, is limited. This limits the image resolution.

Thus, in order to increase the FOV while maintaining the spatial resolution, the frame time increases, and such performance deterioration increases as the distance to the object OBJ increases.

The LiDAR device 1000 according to the example embodiment may use a plurality of light sources to improve this resolution limit. In addition, in an example embodiment, the plurality of light sources may maintain the emission angle differently. Accordingly, the image resolution may increase in proportion to the number of light sources included in the LiDAR device 1000.

Figure 3A:
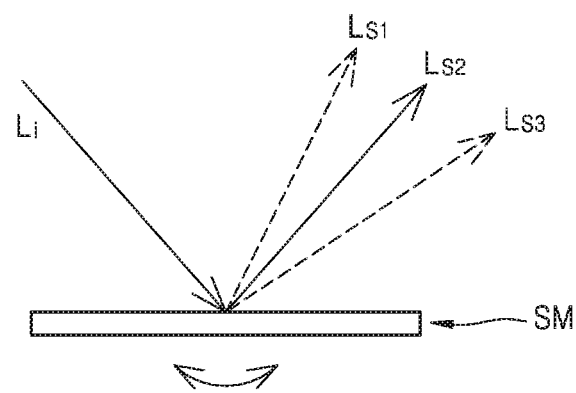
FIGS. 3A and 3B illustrate an example of a beam steering element provided in a LiDAR device and a point scanning principle according to the example embodiment.
Figure 3B:
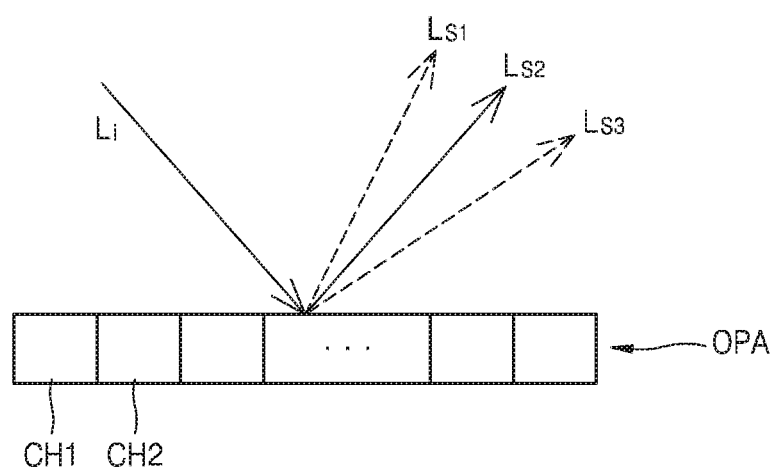

FIGS. 3A and 3B illustrate an example of a beam steering element provided in a LiDAR device and a point scanning principle according to the example embodiment.

Referring to FIG. 3A, the scanning mirror SM is mechanically rotated and the direction of the reflecting surface is adjusted to adjust the steering direction of incident light Li. According to the rotation angle, the direction in which the incident light Li is steered may be sequentially adjusted to LS1, LS2, and LS3. Rotation of the scanning mirror SM is illustrated as uniaxial rotation, but is not limited thereto. For example, rotation of the scanning mirror SM may be a biaxially rotation where the scanning mirror SM is rotationally driven with respect to two rotation axes.

The scanning mirror SM is also shown as having one reflecting surface but embodiments are note limited thereto. For example, a plurality of mirror elements may be arranged and their respective directions may be adjusted to steer the incident light Li in the direction towards the object OBJ.

Referring to FIG. 3B, an optical phased array OPA may include a plurality of channels CH1, CH2, . . . A phase change value for changing the phase of incident light in each of the plurality of channels CH1, CH2, . . . may be set, and accordingly, the direction in which incident light Li is steered and emitted may be adjusted.

Each of the plurality of channels CH1, CH2, . . . , of the optical phased array OPA may include a meta element having a shape dimension of a sub-wavelength of which a phase change value with respect to incident light may be electrically adjusted.

The optical phased array OPA may be a silicon photonics-based optical waveguide that splits a path of incident light Li into a plurality of paths and directs the plurality of paths to respective output terminals, for example, a plurality of channels. Such an optical waveguide may include a phase retarder provided in each of a plurality of branched paths, and may adjust the length of each path and/or the degree of phase delay in the phase retarder of each path to adjust the direction in which incident light Li is steered and emitted.

The optical phased array OPA steers light in a direction determined by a combination of phase changes that occur in each channel with respect to the incident light Li. According to the combination of the phase change values, the direction in which the incident light Li is steered and emitted may be sequentially adjusted to LS1, LS2, and LS3.

Figure 4:
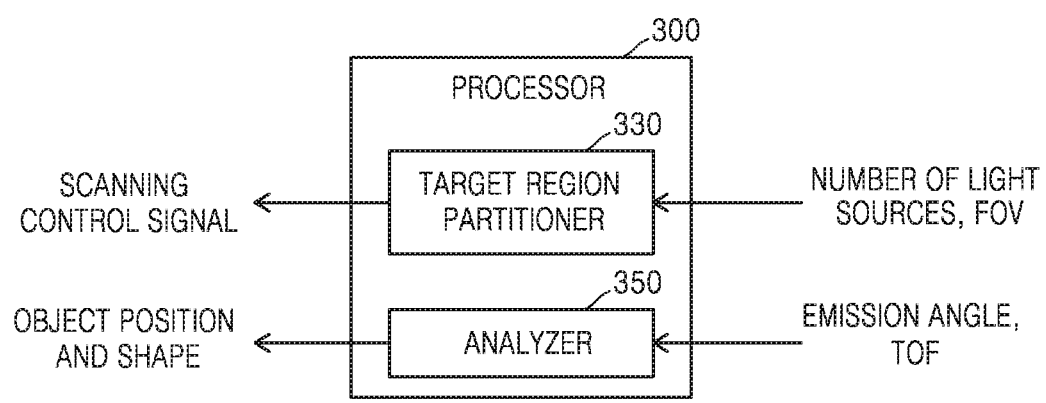
FIG. 4 illustrates an exemplary configuration of a processor included in a LiDAR device according to an example embodiment.
Figure 5:
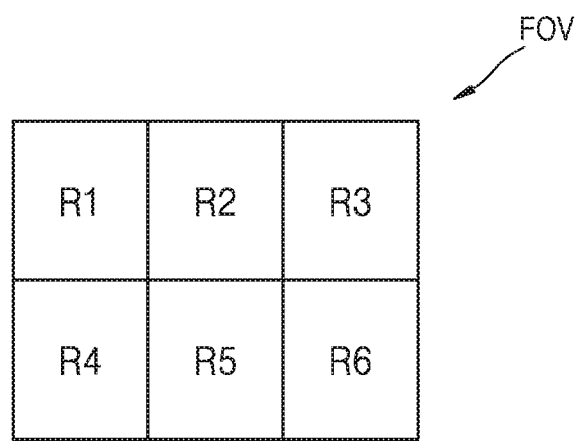
FIG. 5 illustrates an example in which a target area is partitioned by the processor of FIG. 4.

FIG. 4 is a block diagram illustrating an exemplary configuration of a processor included in a LiDAR device according to an example embodiment, and FIG. 5 illustrates an example in which a target area is partitioned by the processor of FIG. 4.

Referring to FIGS. 4 and 5, the processor 300 may include a target region partitioner 330 and an analyzer 350. Code for executing the target region partitioner 330 and the analyzer 350 may be stored in a memory provided in the LiDAR device 1000, and the code may be executed by the processor 300.

The target region partitioner 330 may divide the predetermined FOV range including the object OBJ into the same number as the number of light sources included in the LiDAR device 1000. FIG. 5 illustrates an example in which a FOV range is divided into six when the number of light sources is six. However, this is merely an example, and the number of divisions or the divided forms are not limited thereto.

The target region partitioner 330 may generate a scanning control signal such that the divided region is scanned by the light transmitter 100 and apply the scanning control signal to the light transmitter 100. For example, when the beam steering element 180 is a scanning mirror SM as illustrated in FIG. 3A, the scanning control signal may be a rotation driving control signal for controlling the rotation direction and the rotation angle of the scanning mirror SM.

When the beam steering element 180 is an optical phased array OPA as illustrated in FIG. 3B, the scanning control signal may be a phase control signal to be applied to each channel. The phase control signal may be an electrical signal to be applied to the meta elements constituting each channel, or may be a phase delay signal for a phase retarder provided in each channel.

The analyzer 350 may analyze the position and shape of the object OBJ by considering the emission angle of the light emitted onto the object OBJ and the ToF values calculated considering the emission angle.

Figure 6:
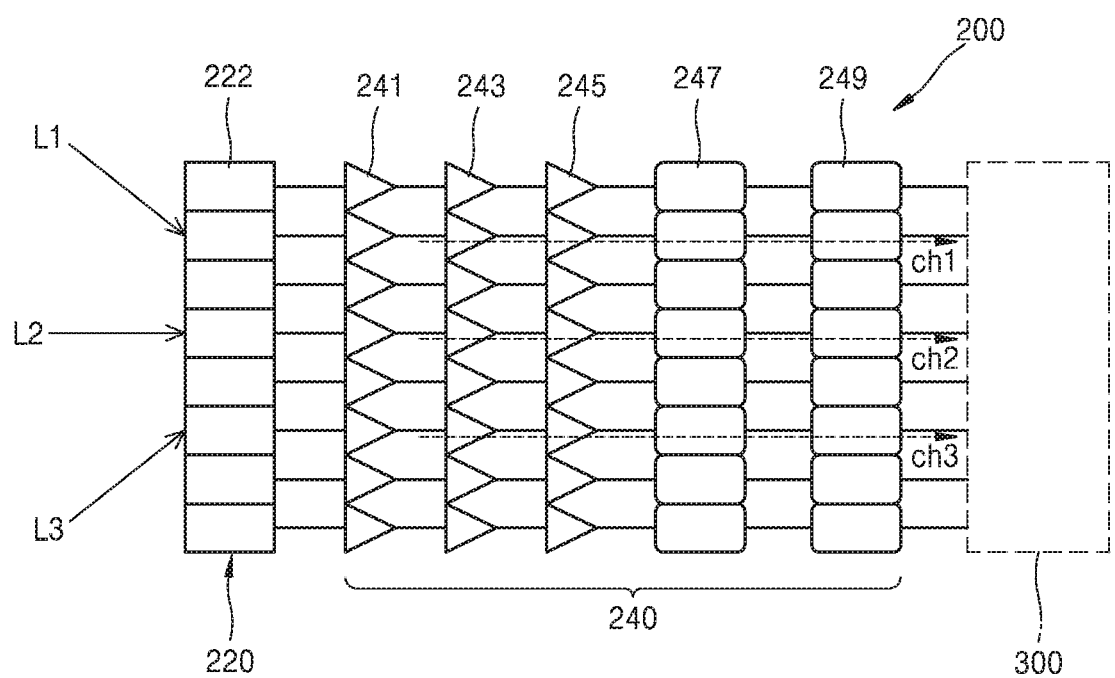
FIG. 6 illustrates an exemplary circuit configuration of a light receiver included in a LiDAR device according to an example embodiment.

FIG. 6 illustrates an exemplary circuit configuration of a light receiver included in a LiDAR device according to an embodiment.

Referring to FIG. 6, the light receiver 200 may include a plurality of light detection elements 222, a crosstalk removing element 247 for removing crosstalk from light detected by each of the plurality of light detection elements 222, and a plurality of time counters 249 for measuring the ToF of the light with crosstalk removed.

The light receiver 200 may include a plurality of current-voltage conversion circuits 241 for converting a current outputted from each of the plurality of light detection elements 222 into a voltage, a plurality of amplifiers 243 for amplifying the current converted by each of the plurality of current-voltage conversion circuits 241, and a plurality of peak detectors 245 for detecting peaks in the signal amplified by the plurality of amplifiers 243.

The plurality of light detection elements 222 may detect light L1, light L2, and light L3 received from the object OBJ and output detection information. Detection information outputted by the plurality of light detection elements 222 may be transmitted to the processor 300 through a plurality of channels ch1, ch2, and ch3.

In detail, the plurality of light detection elements 222 may individually detect light L1, light L2, and light L3 from the object OBJ and output a current signal.

The plurality of current-voltage conversion circuits 241 may convert a current signal outputted from each of the plurality of light detection elements 222 into a voltage signal.

The plurality of amplifiers 243 may amplify the voltage signal outputted by each of the plurality of current-voltage conversion circuits 241.

The plurality of peak detectors 245 may detect the peak in the voltage signal amplified by each of the plurality of amplifiers 243. For example, the plurality of peak detectors 245 may detect the peak by detecting the rising and falling edges of the electrical signal. In addition, the plurality of peak detectors 245 may detect the peak using a constant fraction discriminator (CFD) method. The plurality of peak detectors 245 may further include a comparator and may convert the detected peak into a pulse signal and output the pulse signal.

Moreover, because the detection information outputted by the light detection element 222 means information on the light received by the light detection element 222, the detection information below may mean at least one of the current signal output by the light detection element 222, the voltage signal converted by the current-voltage conversion circuit 241, the voltage signal amplified by the amplifier 243, and the pulse signals output by the comparator.

A plurality of crosstalk removing elements 247 may remove crosstalk from respective detection information output by the plurality of light detection elements 222. The crosstalk removal method of the crosstalk removing element 247 will be described in more detail below with reference to FIG. 9.

A plurality of time counters 249 may measure the ToF of light using detection information from which crosstalk is removed. When a pulse signal output from each of the plurality of peak detectors 245 is input to each of the plurality of time counters 249, each of the plurality of time counters 249 may calculate the number of periods during which clock signals are generated from the light radiation time point by the light source, and measure the ToF of the light. In addition, each of the plurality of time counters 249 may store information on each of ToFs of the measured light in a register. Each of the plurality of time counters 249 may include a TDC.

The measurement results measured by the plurality of time counters 249 are transmitted to the processor 300, and the processor 300 may perform data processing to analyze information on the object, for example, the position and shape of the object, using the measurement results.

Figure 7A:
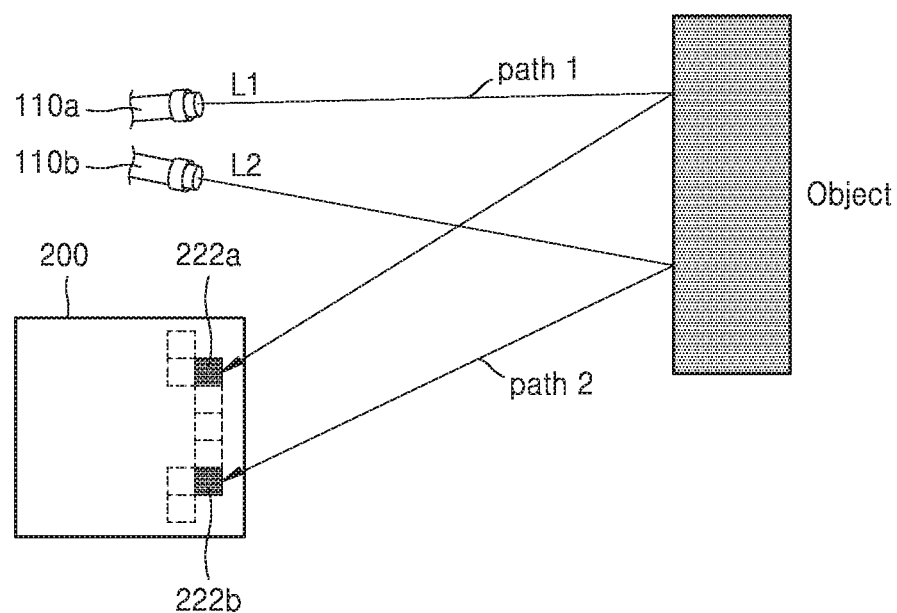
FIGS. 7A and 7B illustrate detection information output by a light receiver when crosstalk does not occur.
Figure 7B:
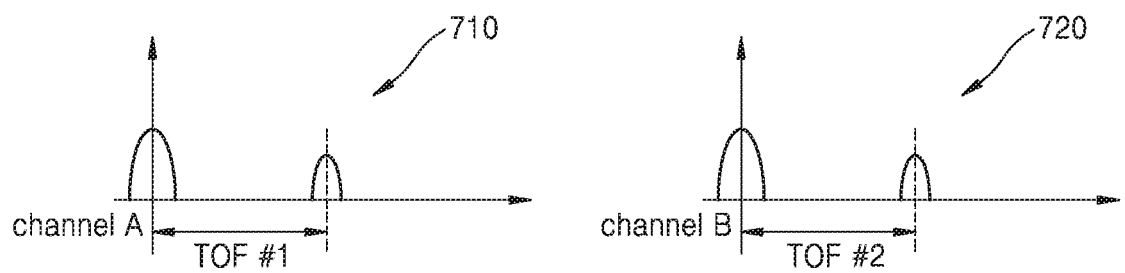

FIGS. 7A and 7B illustrate detection information output by a light receiver when crosstalk does not occur.

Referring to FIGS. 7A and 7B, a first light source 110*a* and a second light source 110*b* may generate first light L1 and second light L2, respectively. The first light source 110*a* and the second light source 110*b* may emit the first light L1 and the second light L2 toward the object OBJ to analyze the position and shape of the object OBJ.

In an example embodiment, the LiDAR device 1000 may further include a beam steering element 180 for adjusting the aiming direction of the first light source 110*a* and the second light source 110*b*, and the beam steering element 180 may allow point light output from the first light source 110*a* and point light output from the second light source 110*b* to scan the entire object OBJ.

The first light L1 generated by the first light source 110*a* and emitted toward the object OBJ may be transmitted to a first light detection element 222*a* through the first path path 1. The second light L2 generated by the second light source 110*b* and emitted toward the object OBJ may be transmitted to a second light detection element 222*b* through the second path path 2.

Detection information 710 detected by the first light detection element 222*a* and detection information 720 detected by the second light detection element 222*b* may be the same as those of FIG. 7B.

The light receiver 200 may calculate a ToF ToF #1 of the first light L1 based on the detection information 710 detected by the first light detection element 222*a*. In addition, the light receiver 200 may calculate a ToF ToF #2 of the second light L2 based on the detection information 720 detected by the second light detection element 222*b*. The processor 300 may analyze the position and shape of the object OBJ based on the ToF ToF #1 of the first light L1 and the ToF ToF #2 of the second light L2.

As shown in FIGS. 7A and 7B, when no crosstalk occurs between the light detection elements, since each light detection element receives only one light, the LiDAR device 1000 may analyze the position and shape of the object OBJ even when the ToF of the light is calculated based on the detection information output by each light detection element. However, if crosstalk occurs between the light detection elements, when the ToF of light is calculated based on detection information output by each light detection element, significant errors may occur in the position and shape analysis of the object OBJ.

Figure 8A:
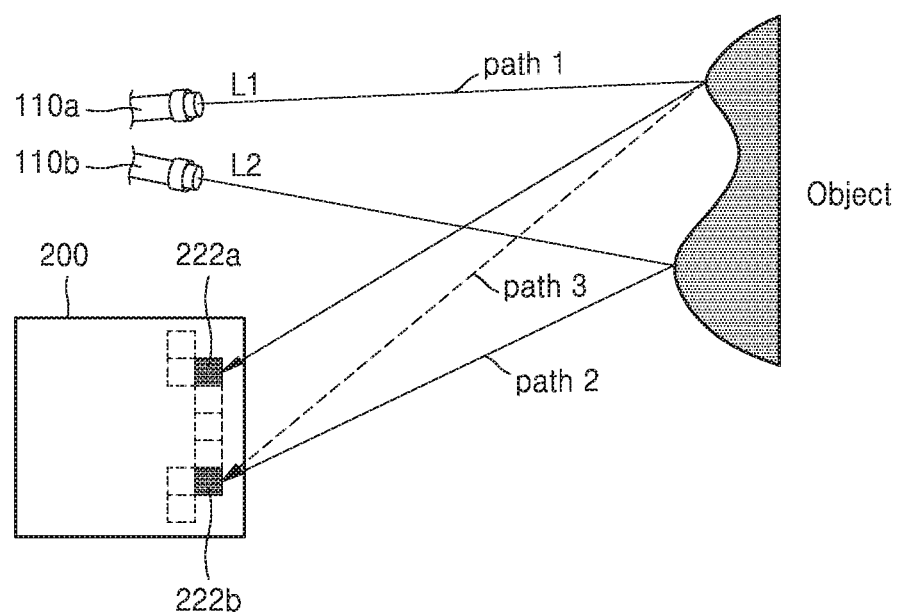
FIGS. 8A and 8B illustrate detection information output by a light receiver when crosstalk occurs.
Figure 8B:
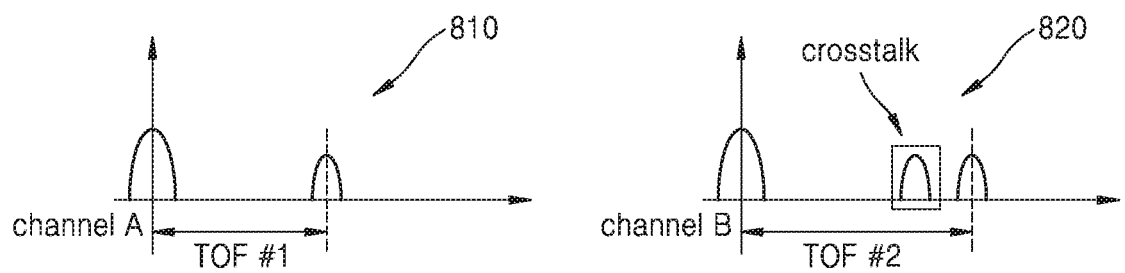

FIGS. 8A and 8B are diagrams for describing detection information output by a light receiver when crosstalk occurs.

Referring to FIGS. 8A and 8B, as shown in FIGS. 7A and 7B, the first light detection element 222*a* may receive first light L1 emitted from the first light source 110*a* toward the object OBJ through the first path path 1 and the second light detection element 222*b* may receive second light L2 emitted from the second light source 110*b* toward the object OBJ through the second path path 2.

Moreover, the second light detection element 222*b* may receive the first light L1 emitted from the first light source 110*a* toward the object OBJ through a third path path 3 that is different from the first path path 1 according to the shape of the object OBJ. Because the second light detection element 222*b* receives the first light L1 in addition to the desired second light L2, the first light L1 may correspond to crosstalk in the detection information output by the second light detection element 222*b*.

FIG. 8B is a diagram illustrating detection information 810 detected by the first light detection element 222*a* and detection information 820 detected by the second light detection element 222*b*.

In FIG. 8B, it can be seen that the detection information 820 detected by the second light detection element 222*b* includes a pulse signal similar to the pulse signal detected by the first light detection element 222*a*. The pulse signal similar to the pulse signal detected by the first light detection element 222*a* in the detection information 820 detected by the second light detection element 222*b* may be crosstalk.

Because the crosstalk detected by the second light detection element 222*b* is generated by the first light L1 generated by the first light source 110*a*, when the second light detection element 222*b* misidentifies the first light L1 as the second light L2 and outputs detection information, the processor 300 may not accurately analyze the position and shape of the object OBJ. Hereinafter, a method of removing crosstalk from detection information output by the light detection elements 222*a* and 222*b* will be described.

Moreover, in FIGS. 8A and 8B, only crosstalk between the first light detection element 222*a* and the second light detection element 222*b* generated by the first light source 110*a* and the second light source 110*b* is illustrated, but embodiments are not limited thereto. According to an example embodiment, the number of light sources may be increased, and the number of light detection elements in which crosstalk occurs may be increased.

Figure 9:
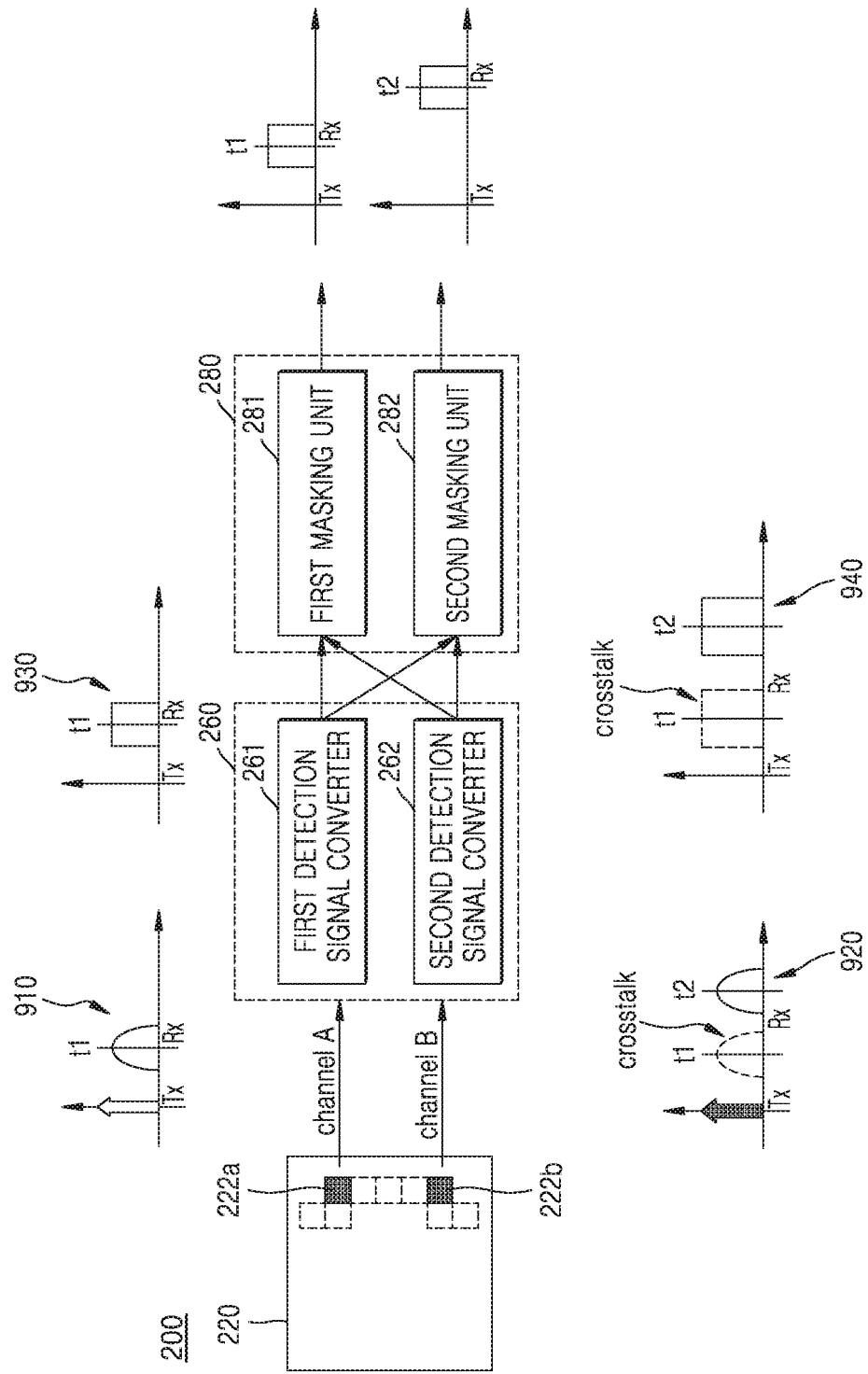
FIG. 9 illustrates an internal block diagram of a light receiver included in a LiDAR device according to an example embodiment.

FIG. 9 illustrates an internal block diagram of a light receiver included in a LiDAR device according to an example embodiment.

Referring to FIG. 9, the light receiver 200 may include a detector array 220 in which a plurality of light detection elements 222 are disposed, a signal converter 260 for converting light detected by the plurality of light detection elements 222 into a detection signal for a ToF calculation, and a crosstalk removing element 280 for removing crosstalk from the detection signal output from the signal converter 260.

The plurality of light detection elements 222 may be disposed in the detector array 220 to receive the reflected light of the light emitted by the light transmitter 100 toward the object OBJ.

In an example embodiment, the plurality of light detection elements 222 may be a first light detection element 222a and a second light detection element 222b.

The first light detection element 222a may receive the first light L1 emitted from the first light source 110a toward the object OBJ through the first path path 1 and the second light detection element 222b may receive the second light L2 emitted from the second light source 110b different from the first light source 110a toward the object OBJ through the second path path 2. Moreover, crosstalk may occur if the first light L1 emitted from the first light source 110a toward the object OBJ is further received by the second light detection element 222b through a third path path 3 that is different from the first path path 1.

The first light detection element 222a may output first detection information on the first light L1. In addition, the second light detection element 222b may output second detection information on the first light L1 and the second light L2.

The first detection information output by the first light detection element 222a and the second detection information output by the second light detection element 222b may be transmitted to the processor 300 through the first channel channel A and the second channel channel B, respectively.

In detail, when receiving the first light L1, the first light detection element 222a may output a first current signal 910 corresponding to the first light L1. When receiving the first light L1 and the second light L2, the second light detection element 222b may output a second current signal 920 corresponding to the first light L1 and the second light L2. The second current signal 920 output by the second light detection element 222b may include crosstalk caused by the first light L1.

The first current signal 910 may be input to the signal converter 260 as first detection information. In addition, the second current signal 920 may be input to the signal converter 260 as second detection information.

The signal converter 260 may convert the current signals output by the plurality of light detection elements 222 into pulse signals for the ToF calculation. The signal converter 260 may be configured to include all of the current-voltage conversion circuits 241, amplifiers 243, peak detectors 245, and comparators of FIG. 6.

The signal converter 260 may include a plurality of detection signal converters respectively connected to the plurality of light detection elements 222 to convert the current signal into a pulse signal. In an example embodiment, the signal converter 260 may include a first detection signal converter 261 connected to the first light detection element 222a and a second detection signal converter 262 connected to the second light detection element 222b.

The first detection signal converter 261 may convert the first current signal 910 output from the first light detection element 222a into a first voltage signal and amplify the first voltage signal. In addition, the first detection signal converter 261 may detect a peak in the amplified first voltage signal, convert the detected peak into a first pulse signal 930, and output the first pulse signal 930. In the same manner, the second detection signal converter 262 converts the second current signal 920 output by the second light detection element 222b into a second voltage signal and amplifies the second voltage signal, and then, detect a peak in the amplified second voltage signal, convert the peak into a second pulse signal 940, and output the second pulse signal 940. The second pulse signal 940 output by the second detection signal converter 262 may still include crosstalk due to the first light L1.

The first pulse signal 930 may be input to the crosstalk removing element 280 as first detection information. The second pulse signal 940 may be input to the crosstalk removing element 280 as second detection information.

Moreover, the signal converter 260 may allow sharing of detection information between a plurality of channels.

For example, any one of the plurality of detection signal converters may provide detection information to the remaining channels except for its own channel.

In an example embodiment, the first detection signal converter 261 may transmit the first pulse signal 930 to the second masking unit 282 disposed in the second channel channel B. In addition, the second detection signal converter 262 may transmit the second pulse signal 940 to the first masking unit 281 disposed in the first channel channel A. The shared pulse signal can be used for identification and removal of crosstalk.

The crosstalk removing element 280 may include a plurality of masking units that identify crosstalk in a pulse signal output by the signal converter 260 and mask the identified crosstalk.

In an example embodiment, the crosstalk removing element 280 may include a first masking unit 281 connected to the first detection signal converter 261 and a second masking unit 282 connected to the second detection signal converter 262.

The crosstalk removing element 280 may calculate whether crosstalk is included in the pulse signal output from the signal converter 260. In an example embodiment, the crosstalk removing element 280 may determine whether crosstalk is included in the detection information based on at least one of the number of pulses included in the pulse signal and the time point at which the pulses are received.

Determining whether crosstalk is included in the detection information may be performed in each of the masking units included in the crosstalk removing element 280.

When the crosstalk removing element 280 calculates that the crosstalk is included in the detection information, it may identify the crosstalk in the pulse signal provided by the signal converter 260.

In FIG. 9, the second masking unit 282 may further receive the second pulse signal 940 from the second detection signal converter 262. The second masking unit 282 may determine that a pulse corresponding to the pulse included in the first pulse signal 930 among the pulses included in the second pulse signal 940 is crosstalk. The second masking unit 282 may identify crosstalk in the second pulse signal 940 based on a pulse included in the first pulse signal 930. The second masking unit 282 may identify crosstalk in the second pulse signal 940 based on at least one of a reception time point, pulse width, and pulse size of the pulse included in the first pulse signal 930. Because the pulse included in the first pulse signal 930 is generated when the first light detection element 222a receives the first light L1, the reception time point of the pulse included in the first pulse signal 930 may have the same meaning as the first reception time point of the first light L1 received by the first light detection element 222a. Similarly, because the pulse included in the second pulse signal 940 is generated when the second light detection element 222b receives the first light L1, the reception time point of the pulse included in the second pulse signal 940 may have the same meaning as the second reception time point of the first light L1 received by the second light detection element 222b.

In an example embodiment, the second masking unit 282 may determine that among the pulses included in the second pulse signal 940, a pulse received between a time point earlier by a predetermined time point and a time point later by the predetermined time point is crosstalk due to the first light L1, based on the first reception time point of the first light L1 included in the first pulse signal 930.

The crosstalk removing element 280 may identify the crosstalk in the detection information, and then, remove the identified crosstalk.

In FIG. 9, the second masking unit 282 may determine the removal start time point of crosstalk. The second masking unit 282 may compare the first reception time point of the first light L1 detected by the first light detection element and the second reception time point of the first light L1 detected by the second light detection element. The second masking unit 282 may determine an earlier time point among the first reception time point and the second reception time point as a removal start time point for removal of crosstalk.

The second masking unit 282 may remove a pulse within a predetermined masking pulse width from a removal start time point among pulses included in the second pulse signal 940. In this case, the masking pulse width may be set larger than the pulse width of the light emitted by the light transmitter 100. A crosstalk identification and removal method is described in more detail with reference to FIGS. 10A and 10B.

When crosstalk is included in the detection information, the crosstalk removing element 280 may remove the crosstalk and output the detection information. Information output by the crosstalk removing element 280 may be output information.

Moreover, the plurality of time counters 249 may measure the ToF of light using output information. In addition, the processor 300 may obtain information on the object OBJ based on the ToF of the light calculated by the time counter 249. Because the processor 300 obtains information on the object OBJ using the detection information with crosstalk removed, the LiDAR device 1000 according to the example embodiment may more accurately measure the position, shape, and the like of the object OBJ.

Moreover, in FIG. 9, only crosstalk occurring between the first light detection element 222a and the second light detection element 222b is described, but embodiments are not limited thereto. According to the shape of the object OBJ, the number of light detection elements in which crosstalk occurs may increase. In this case, the second detection information may refer to detection information including crosstalk, and the first detection information may refer to detection information used to remove crosstalk from the second detection information.

Figure 10A:
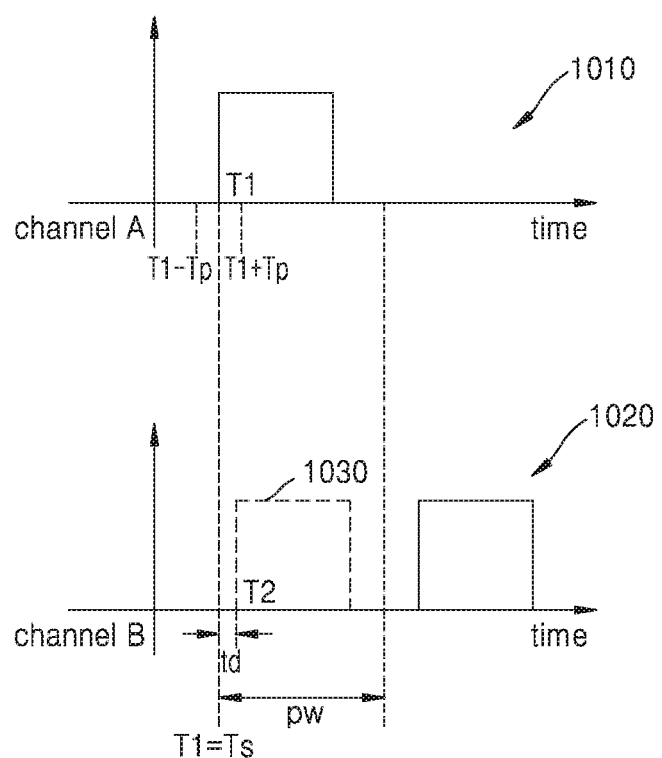
FIGS. 10A and 10B illustrate a crosstalk identification method and removal method using first detection information and second detection information of FIG. 9.
Figure 10B:
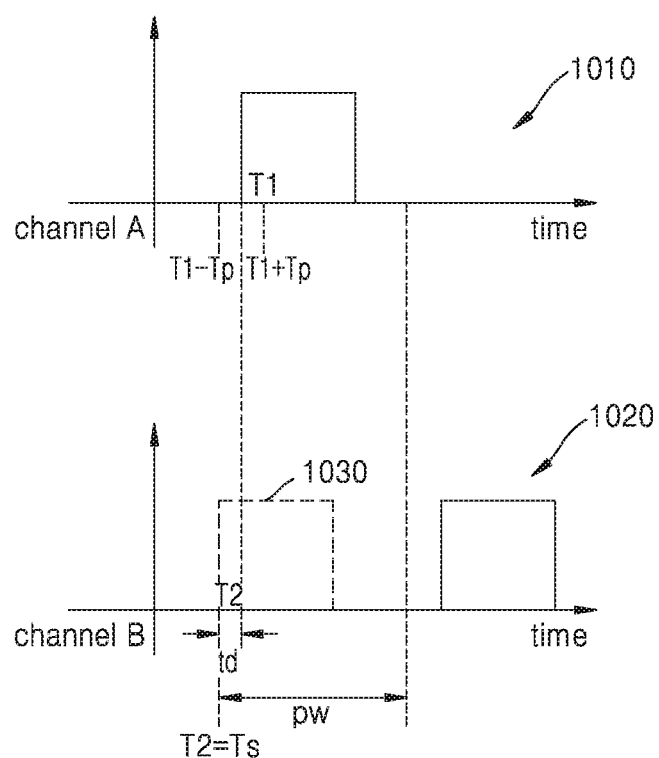

FIGS. 10A and 10B are diagrams for describing a crosstalk identification method and removal method using the first detection information and the second detection information of FIG. 9.

Referring to FIGS. 10A and 10B, the second masking unit 282 may identify crosstalk included in the second detection information 1020 based on the first reception time point T1 of the first light L1 included in the first detection information 1010.

Moreover, as in FIGS. 8A and 8B, the first light L1 generated by the first light source 110a and emitted toward the object OBJ may be transmitted to the first light detection element 222a through the first path path 1, and may be transmitted to the second light detection element 222b through the third path path 3. In this case, the distance of the first path path 1 may be greater or less than the distance of the third path path 3 according to the shape of the object OBJ. Accordingly, the first reception time point T1 of the first light L1 detected by the first light detection element 222a may be greater or less than the second reception time point T2 of the first light L1 detected by the second light detection element 222b.

FIG. 10A illustrates a case where a first reception time point T1 is earlier than a second reception time point T2, and FIG. 10B illustrates a case where the first reception time point T1 is later than the second reception time point T2.

The second masking unit 282 may determine, as crosstalk, the pulse 1030 received between the time point T1−Tp earlier by the predetermined time point Tp and the time point T1+Tp later by the predetermined time point Tp, based on the first reception time point T1.

After identifying the crosstalk, the second masking unit 282 may determine the removal start time point Ts of the crosstalk. The second masking unit 282 may compare the first reception time point T1 of the first light L1 detected by the first light detection element 222a with the second reception time point T2 of the first light L1 detected by the second light detection element. The second masking unit 282 may determine an earlier time point among the first reception time point T1 and the second reception time point T2 as a removal start time point Ts for removal of crosstalk.

As shown in FIG. 10A, when the first receiving time point T1 is earlier than the second receiving time point T2, the second masking unit 282 may determine the first reception time point T1 as the removal start time point Ts. On the other hand, as shown in FIG. 10B, when the first receiving time point T1 is later than the second receiving time point T2, the second masking unit 282 may determine the second reception time point T2 as the removal start time point Ts.

The second masking unit 282 may remove pulses located within a predetermined masking pulse width pw from a removal start time point Ts among the pulses included in the second detection information 1020.

As shown in FIG. 10A, in consideration of the difference td between the first reception time point T1 and the second reception time point T2 according to the path of the first light L1, the masking pulse width pw may be set greater than the pulse width of the first light L1 emitted by the first light source 110a.

Figure 11:
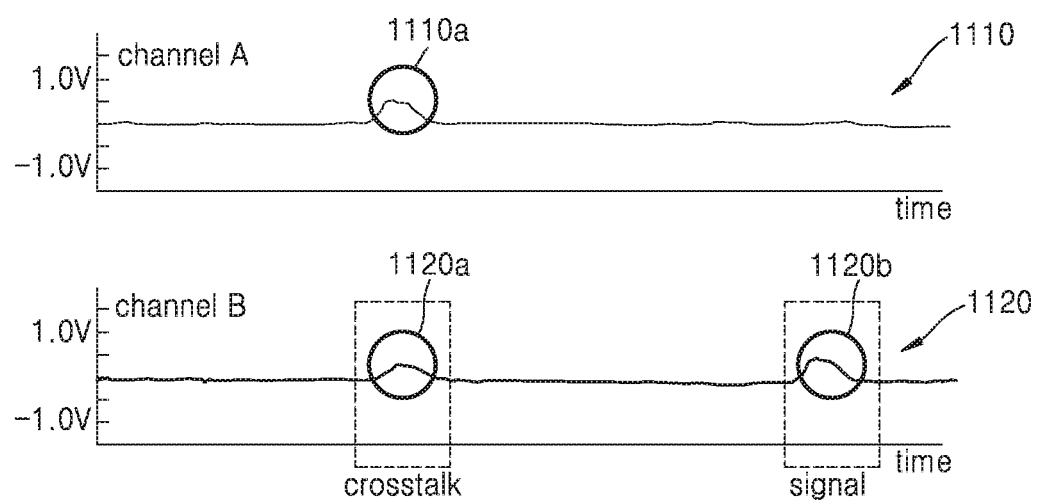
FIG. 11 illustrates an example in the case where crosstalk occurs.

FIG. 11 illustrates an example where crosstalk occurs.

Referring to FIG. 11, an example of the first current signal 1110 output by the first light detection element 222a and the second current signal 1120 output by the second light detection element 222b is illustrated.

The first point 1110a is a point at which the first light detection element 222a receives the first light L1, and the first light detection element 222a outputs a current above a threshold level at the first point 1110a.

The second point 1120a is a point at which the second light detection element 222b receives the first light L1, and a current signal output from the second light detection element 222b at the second point 1120a corresponds to crosstalk. The current signal output by the second light detection element 222b at the second point 1120a is less than the current signal output by the first light detection element 222a at the first point 1110a, but has a current level above a threshold level, and thus, is converted into a pulse signal.

The third point 1120b is a point at which the second light detection element 222b receives the second light L2, and the current signal output by the second light detection element 222*b* at the third point 1120*b* needs to be changed into a pulse signal for the ToF calculation of the second light L2.

The second current signal 1120 output by the second light detection element 222*b* is converted into a pulse signal and used for the ToF calculation of the second light L2, but as illustrated in FIG. 11, crosstalk is included in the second current signal 1120, such that the LiDAR device 1000 may not accurately calculate the ToF of the second light L2. Accordingly, an error occurs in the information on the object OBJ analyzed by the LiDAR device 1000.

In order to analyze the information on the object OBJ more accurately, the LiDAR device 1000 according to an example embodiment removes crosstalk from the second detection information output by the second light detection element 222*b* based on the first detection information output by the first light detection element 222*a*.

Figure 12:
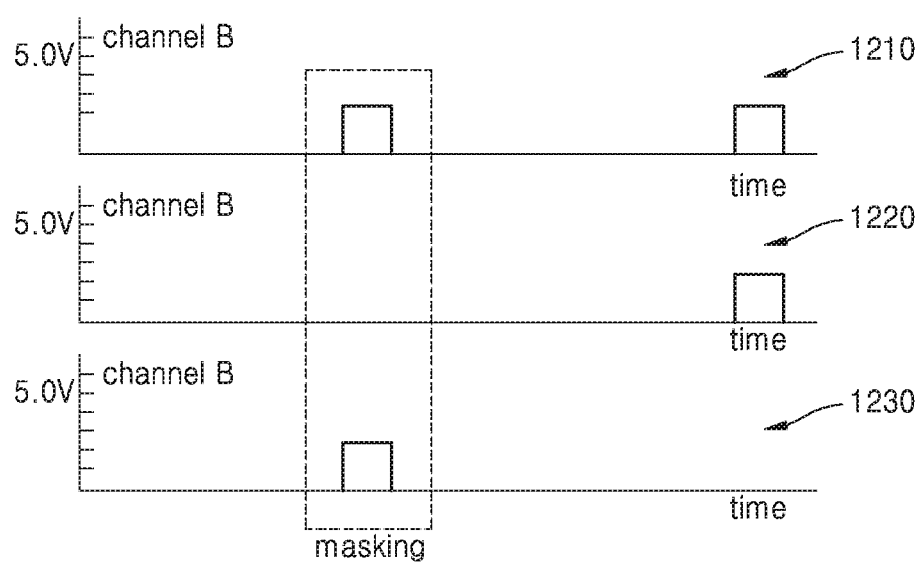
FIG. 12 illustrates an example in the case of removing crosstalk through a masking pulse.

FIG. 12 illustrates an example of removing crosstalk through a masking pulse.

Referring to FIG. 12, the LiDAR device 1000 may convert the first current signal 1110 output by the first light detection element 222*a* and the second current signal 1120 output by the second light detection element 222*b* into a first pulse signal and a second pulse signal 1210, respectively.

The second masking unit 282 identifies crosstalk in the second pulse signal 1210 based on at least one of a reception time point, pulse width, and pulse size of the pulse included in the first pulse signal.

The second masking unit 282 calculates a removal start time point Ts for removing crosstalk and removes a pulse located within a predetermined masking pulse width pw from a removal start time point Ts.

The second masking unit 282 outputs a masking pulse 1230 having a predetermined masking pulse width pw from the removal start time point Ts, and removes the pulse corresponding to the crosstalk from the second pulse signal 1210 using the masking pulse 1230. For this, the second masking unit 282 may include a gate circuit.

The second masking unit 282 outputs a pulse 1220 with crosstalk removed, and the processor 300 obtains information on the object OBJ using the pulse 1220 with crosstalk removed. Accordingly, the LiDAR device 1000 according to an example embodiment may more accurately obtain information on the object OBJ.

Figure 13:
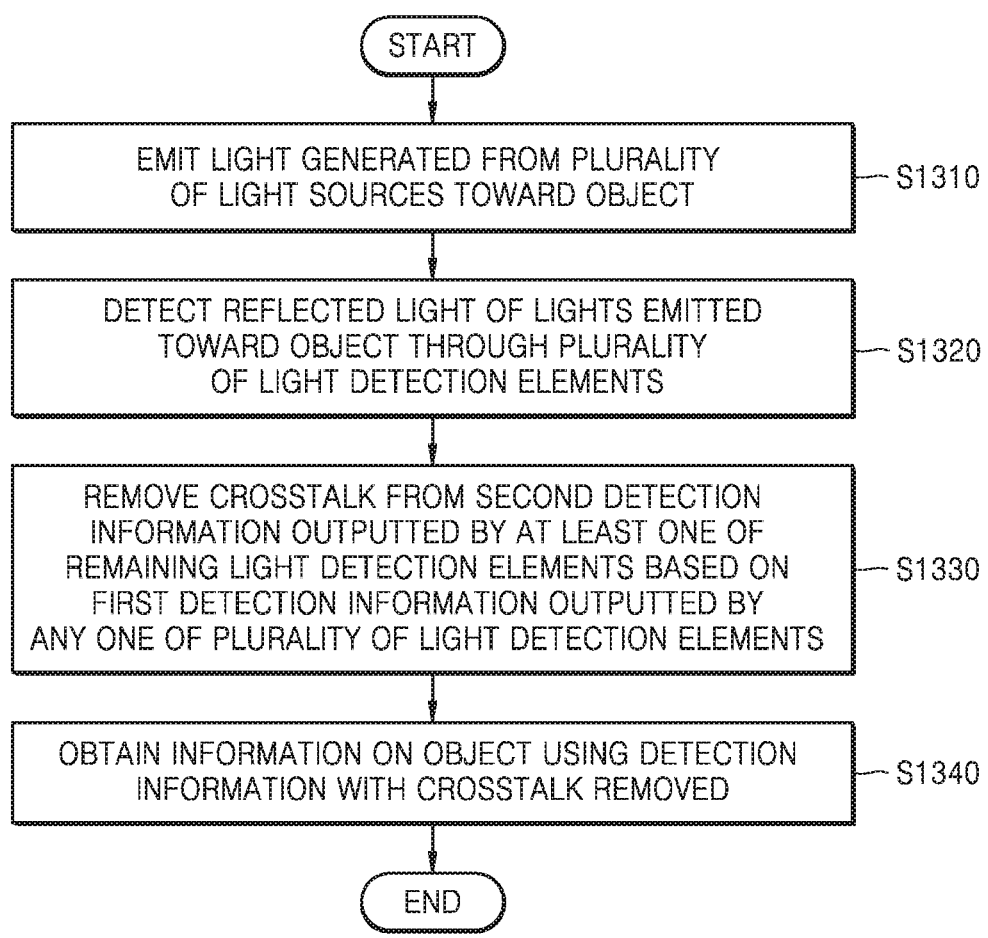
FIG. 13 is a flowchart illustrating a method of operating a LiDAR device according to an example embodiment.

FIG. 13 is a flowchart illustrating a method of operating a LiDAR device according to an example embodiment.

Referring to FIG. 13, a light transmitter 100 may include a plurality of light sources and emit light generated from the plurality of light sources toward an object (S1310).

The light transmitter 100 uses a point scanning method for scanning point light on the object OBJ, and scans the entire area of the object OBJ through a plurality of light sources. For this, the light transmitter 100 may include a beam steering element 180 that changes the aiming direction of the plurality of light sources such that the light generated by the plurality of light sources is aimed toward the object OBJ at different emission angles or at the same emission angle.

The light receiver 200 may detect reflected light of the lights emitted toward the object OBJ through the plurality of light detection elements 222 (S1320).

In order to increase the reception capability of reflected light, the light detection element 222 may include an avalanche photo diode (APD) or a single photon avalanche diode (DAD), but embodiments are not limited thereto.

Moreover, according to the shape of the object OBJ, any one of the plurality of light detection elements 222 may receive the plurality of reflected lights. One of the plurality of reflected lights may correspond to crosstalk causing an error in the position and shape analysis of the object OBJ.

The LiDAR device 1000 according to an example embodiment may convert the detection information output by the plurality of light detection elements 222 into a pulse wave pulse signal in order to remove crosstalk.

A method of receiving the reflected light and converting the detection information into the pulse signal when crosstalk occurs will be described with reference to FIG. 14.

The light receiver 200 may remove crosstalk from the second detection information output by at least one of the remaining light detection elements based on the first detection information output by any one of the plurality of light detection elements (S1330).

In this case, the second detection information may refer to detection information output by the light detection element 222 that receives the plurality of reflected lights. In addition, the first detection information is detection information used to remove crosstalk included in the second detection information, and may be detection information different from the second detection information.

In an example embodiment, the light receiver 200 may determine whether crosstalk is included in the second detection information based on at least one of the number of pulses included in the second detection information and a reception time point of the pulse. In addition, when the light receiver 200 calculates that the crosstalk is included in the second detection information, the light receiver 200 may identify the crosstalk in the second detection information. In addition, the light receiver 200 may remove the identified crosstalk.

A method of calculating whether crosstalk is included and a crosstalk identification method will be described with reference to FIG. 15, and the crosstalk removal method will be described with reference to FIG. 16.

The processor 300 may obtain information on the object OBJ using the detection information with crosstalk removed (S1340).

The processor 300 may obtain information on the object OBJ using the first detection information and the second detection information with crosstalk removed.

The processor 300 may calculate a distance to the object OBJ based on the ToF of the lights detected by the light receiver 200, and perform data processing for analyzing the position and shape of the object OBJ.

Figure 14:
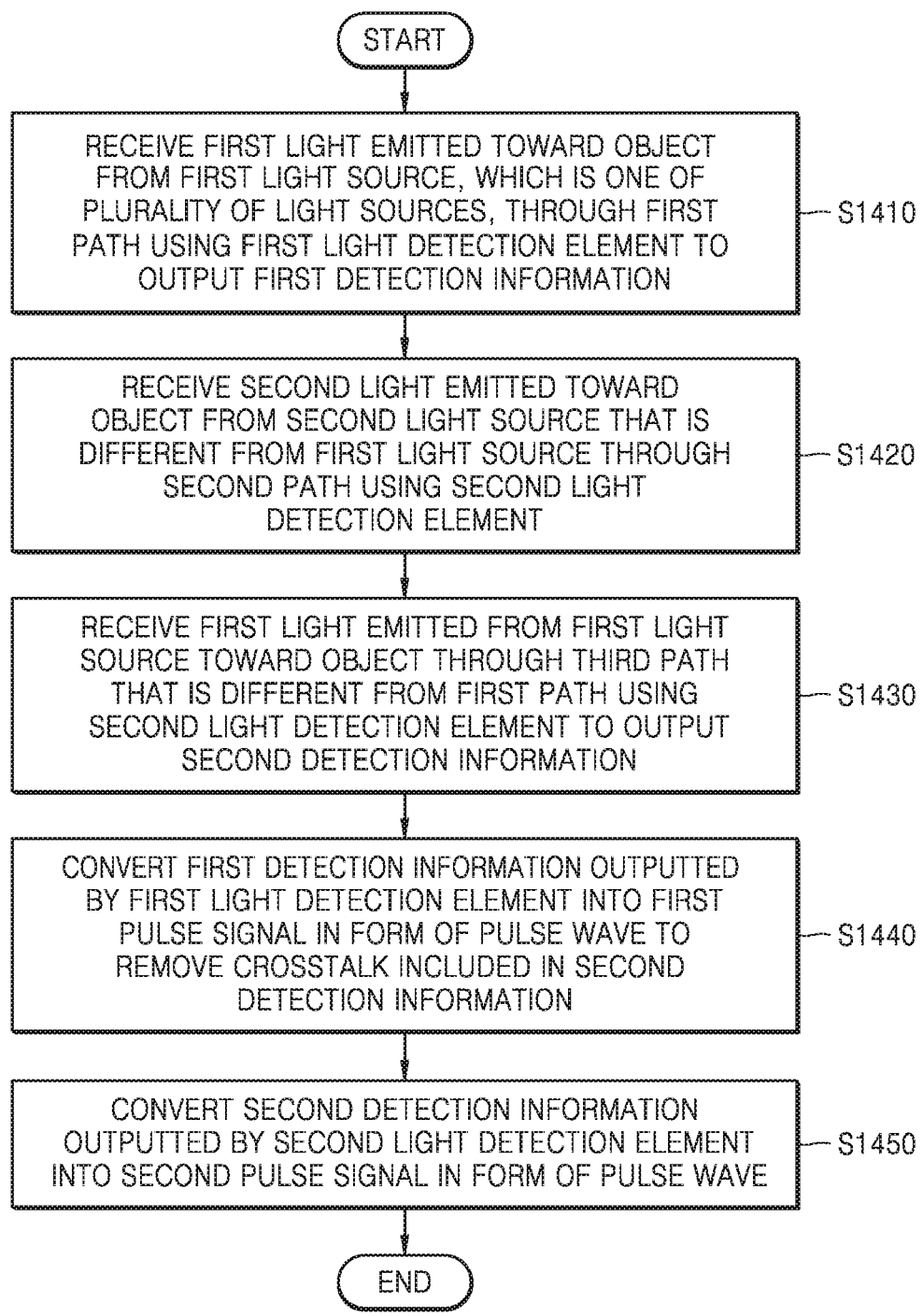
FIG. 14 is a flowchart illustrating a method of detecting reflected lights through a plurality of light detection elements.

FIG. 14 is a flowchart illustrating a method of detecting reflected lights through a plurality of light detection elements.

Referring to FIG. 14, the light receiver 200 receives the first light L1 emitted toward the object OBJ from the first light source 110*a*, which is one of the plurality of light sources, through the first path path 1 using the first light detection element 222*a* to output the first detection information (S1410).

In addition, the light receiver 200 may receive the second light L2 emitted toward the object OBJ from the second light source 110*b* different from the first light source 110*a* through the second path path 2 using the second light detection element 222*b* (S1420).

In this case, the first light detection element 222*a* and the second light detection element 222*b* are merely for distinguishing light detection elements for receiving light and may not be neighboring light detection elements.

Moreover, if crosstalk occurs, the light receiver 200 receives the first light L1 radiated from the first light source 110*a* toward the object OBJ through the third path path 3 that is different from the first path path 1 using the second light detection element 222b to output the second detection information (S1430).

In the second detection information output by the second light detection element 222b, information on the first light L1 may correspond to crosstalk.

The light receiver 200 may convert the first detection information output by the first light detection element 222a into a first pulse signal in the form of a pulse wave to remove crosstalk included in the second detection information (S1440).

In addition, the light receiver 200 may convert the second detection information output by the second light detection element 222b into a second pulse signal in the form of a pulse wave (S1450).

The first pulse signal may be transmitted to the crosstalk removing element 280 through a first channel channel A. The second pulse signal may be transmitted to the crosstalk removing element 280 through the second channel channel B.

The light receiver 200 may allow sharing of detection information between a plurality of channels. Accordingly, the first pulse signal may be provided to the second channel channel B, and the second pulse signal may be provided to the first channel channel A. The shared pulse signal can be used for identification and removal of crosstalk.

The light receiver 200 may identify crosstalk in the second pulse signal based on the first pulse signal and remove crosstalk from the second pulse signal.

Figure 15:
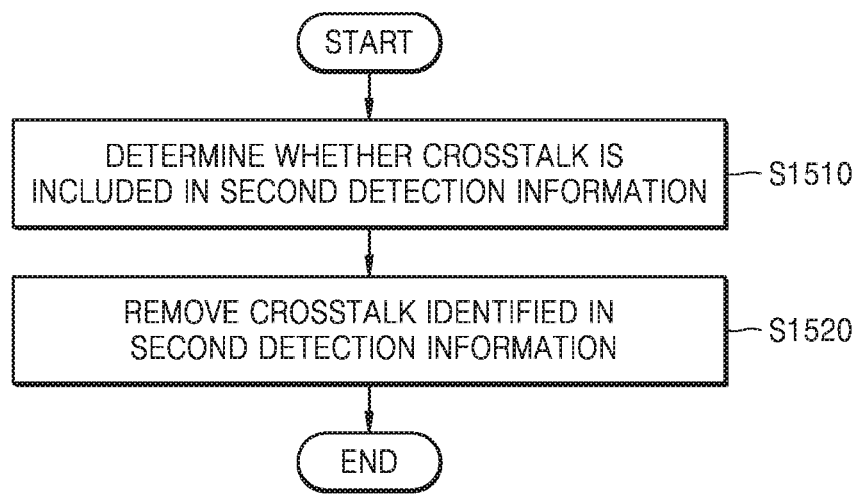
FIG. 15 is a flowchart illustrating a method of identifying crosstalk in detection information outputted by a plurality of light detection elements.

FIG. 15 is a flowchart illustrating a method of identifying crosstalk in detection information output by a plurality of light detection elements according to an example embodiment.

In an example embodiment, operations S1510 to S1520 may be performed before the detection information is converted into a pulse signal. In another example embodiment, operations S1510 to S1520 may be performed after the detection information is converted into a pulse signal.

Referring to FIG. 15, the light receiver 200 may determine whether crosstalk is included in the second detection information (S1510). In an example embodiment, the light receiver 200 may determine whether crosstalk is included in the second detection information based on at least one of the number of pulses included in the second detection information and a reception time point of the pulse.

For example, when the number of pulses included in the second detection information is two or more, the light receiver 200 may determine that the second detection information includes the crosstalk, but embodiments are not limited thereto.

When the light receiver 200 calculates that the crosstalk is included in the second detection information, the light receiver 200 may identify the crosstalk in the second detection information. To identify the crosstalk in the second detection information, the light receiver 200 may use the first detection information.

The light receiver 200 may identify crosstalk in the second detection information based on the pulse included in the first detection information. The light receiver 200 may identify crosstalk in the second detection information based on at least one of a reception time point, pulse width, and pulse size of the pulse included in the first detection information.

In an example embodiment, the light receiver 200 may calculate a pulse having a pulse width larger than a predetermined pulse width among pulses included in the first detection information as a pulse by the first light L1. In addition, the light receiver 200 may calculate a pulse having a pulse width larger than a predetermined pulse width among pulses included in the first detection information as a pulse by the first light L1. In this case, the predetermined pulse width and pulse size may be set in consideration of the output of the light transmitter 100.

In another example embodiment, the light receiver 200 may calculate a pulse having the largest pulse width among pulses included in the first detection information as a pulse by the first light L1. According to another example embodiment, the light receiver 200 may calculate a pulse having the largest pulse size among pulses included in the first detection information as a pulse by the first light L1.

The light receiver 200 may identify the crosstalk included in the second detection information based on the pulse information by the first light L1 included in the first detection information.

The light receiver 200 may identify the crosstalk included in the second detection information based on the first reception time point of the first light L1 included in the first detection information.

According to the shape of the object OBJ, the first reception time point of the first light L1 detected by the first light detection element 222a may be greater or less than the second reception time point of the first light L1 detected by the second light detection element 222b.

Accordingly, the light receiver 200 may determine, as crosstalk, the pulse received between the time point earlier by the predetermined time point and the time point later by the predetermined time point, based on the first reception time point.

The light receiver 200 may remove the crosstalk identified in the second detection information (S1520).

Figure 16:
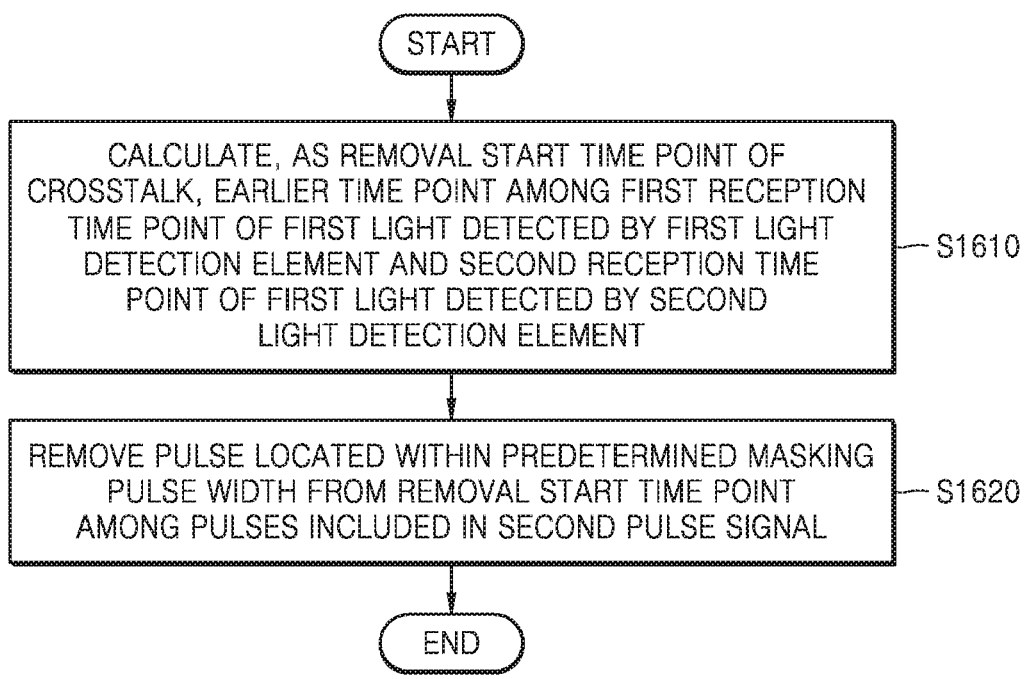
FIG. 16 is a flowchart illustrating a method of removing crosstalk in detection information outputted by a plurality of light detection elements.

FIG. 16 is a flowchart illustrating a method of removing crosstalk in detection information output by a plurality of light detection elements.

Referring to FIG. 16, the light receiver 200 may calculate, as the removal start time point of crosstalk, an earlier time point among the first reception time point of the first light L1 detected by the first light detection element and the second reception time point of the first light L1 detected by the second light detection element (S1610).

The light receiver 200 may compare the first reception time point of the first light L1 detected by the first light detection element 222a and the second reception time point of the first light L1 detected by the second light detection element 222b.

According to the shape of the object OBJ, the first reception time point of the first light L1 detected by the first light detection element 222a may be greater or less than the second reception time point of the first light L1 detected by the second light detection element 222b. Therefore, in order to completely remove the crosstalk, an earlier time point among the first reception time point and the second reception time point needs to be set as the removal start time point of the crosstalk. For example, when the first receiving time point is earlier than the second receiving time point, the light receiver 200 may determine the first reception time point as the removal start time point. On the other hand, when the first receiving time point is later than the second receiving time point, the light receiver 200 may determine the second reception time point as the removal start time point.

The light receiver 200 may remove a pulse located within a predetermined masking pulse width from a removal start time point among pulses included in the second pulse signal (S1620).

The light receiver 200 may output a masking pulse having a predetermined masking pulse width at the removal start time point, and remove the pulse corresponding to the crosstalk from the second pulse signal using the masking pulse. For this, the light receiver 200 may include a gate circuit.

Moreover, the light receiver 200 may output a second pulse signal with crosstalk removed, and the processor 300 may obtain information on the object OBJ using the second pulse with crosstalk removed.

As described above, even when the LiDAR device 1000 according to an example embodiment includes a plurality of light sources and a plurality of light detection elements that receive light emitted from the plurality of light sources to achieve high image resolution within a given frame time, the LiDAR device 1000 may analyze the position and shape of the object OBJ more accurately by removing crosstalk between the plurality of light detection elements.

Moreover, the above-mentioned example embodiments can be written as a program that can be executed on a computer and can be implemented in a general-purpose digital computer for operating the program using a computer-readable recording medium. In addition, the structure of the data used in the above example embodiments can be recorded on the computer-readable recording medium through various means. The computer readable recording medium may include a storage medium such as a magnetic storage medium, for example, a ROM, a floppy disk, a hard disk, etc., and an optical reading medium, for example, a CD-ROM, a DVD, etc.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A light detection and ranging (LiDAR) device comprising:
    a light transmitter comprising a plurality of light sources that comprises a first light source and a second light source, each of the plurality of light sources being configured to emit light toward an object;
    a light receiver comprising a plurality of light detection elements that comprises a first light detection element and a second light detection element, each of the plurality of light detection elements being configured to detect reflected light reflected from the object that is irradiated with the light emitted by the plurality of light sources; and
    a processor configured to obtain information on the object,
    wherein the first light detection element is configured to receive a first reflected light reflected from the object that is irradiated with a first light emitted by the first light source among the plurality of light sources, and to output first detection information corresponding to the first reflected light,
    wherein the second light detection element is configured to receive a second reflected light reflected from the object that is irradiated with a second light emitted by the second light source among the plurality of light sources, the second light source being different from the first light source,
    wherein the second light detection element outputs second detection information based on the second reflected light and a crosstalk generated,
    wherein the light receiver further comprises:
    a first detection signal converter configured to convert the first detection information output by the first light detection element into a first pulse signal;
    a second detection signal converter configured to convert the second detection information output by the second light detection element into a second pulse signal; and
    a crosstalk removing element configured to receive the first pulse signal and the second pulse signal, identify a crosstalk in the second pulse signal based on a determination that a pulse corresponding to at least one of a reception time point, a pulse width, and a pulse size, of a pulse included in the first pulse signal, is included in the second pulse signal, and remove the identified crosstalk from the second pulse signal, and
    wherein the processor is further configured to obtain the information on the object based on the second detection information, from which the crosstalk has been removed.

2. The LiDAR device of claim 1, wherein the processor is further configured to obtain a distance to the object based on a time of flight of light detected by each of the plurality of light detection elements, and analyze a position of the object and a shape of the object.

3. The LiDAR device of claim 1, wherein the light receiver is further configured to remove the crosstalk from the second detection information using a masking pulse which is generated based on the first detection information.

4. The LiDAR device of claim 1, wherein the light receiver is configured to determine, as a removal start time point of the crosstalk, an earlier time point among a first reception time point of the first reflected light detected by the first light detection element and a second reception time point of the first reflected light detected by the second light detection element, and
    wherein the crosstalk removing element is configured to remove a pulse from among pulses included in the second pulse signal, wherein the pulse is located within a predetermined time period from the removal start time point.

5. The LiDAR device of claim 4, wherein a predetermined masking pulse width is set to be larger than a pulse width of the first reflected light.

6. The LiDAR device of claim 1, wherein the light transmitter further comprises a beam steering element configured to adjust an emission direction of light emitted by each of the plurality of light sources to scan the object.

7. The LiDAR device of claim 6, wherein the beam steering element is configured to control the emission direction of the light emitted by each of the plurality of light sources by mechanical rotation.

8. The LiDAR device of claim 1, wherein the light receiver comprises a plurality of counters configured to count a time of flight of light detected by each of the plurality of light detection elements.

9. A method of operating a light detection and ranging (LiDAR) device, the method comprising:
    emitting, from a plurality of light sources comprising a first light source and a second light source, light toward an object;

detecting, by a plurality of light detection elements comprising a first light detection element and a second light detection element, reflected light reflected from the object that is irradiated with the light emitted by the plurality of light sources;

receiving, by the first light detection element, a first reflected light reflected from the object that is irradiated with a first light emitted by the first light source among the plurality of light sources and outputting, by the first light detection element, first detection information corresponding to the first reflected light;

receiving, by the second light detection element, a second reflected light reflected from the object that is irradiated with a second light emitted by the second light source among the plurality of light sources, the second light source being different from the first light source; and obtaining second detection information output by the second light detection element based on the second reflected light and a crosstalk generated, wherein the detecting of the reflected light comprises:

converting the first detection information output by the first light detection element into a first pulse signal; and converting the second detection information output by the second light detection element into a second pulse signal, and wherein the method further comprises:

from the first pulse signal and the second pulse signal, identifying a crosstalk in the second pulse signal based on a determination that a pulse corresponding to at least one of a reception time point, a pulse width, and a pulse size, of a pulse included in the first pulse signal, is included in the second pulse signal;

removing the identified crosstalk from the second pulse signal; and obtaining information on the object based on the second detection information, from which the crosstalk has been removed.

10. The method of claim 9, wherein the removing of the identified crosstalk comprises:

determining as a removal start time point of the crosstalk, an earlier time point among a first reception time point of the first reflected light detected by the first light detection element and a second reception time point of the first reflected light detected by the second light detection element; and removing a pulse located within a predetermined masking pulse width from the removal start time point among pulses included in the second pulse signal.

11. The method of claim 10, wherein the predetermined masking pulse width is set to be larger than a pulse width of the first reflected light and a pulse width of the second reflected light, respectively.

12. The method of claim 9, wherein the obtaining of the information comprises counting a time of flight of light detected by each of the plurality of light detection elements.

13. The method of claim 12, wherein the obtaining of the information further comprises obtaining a distance to the object based on the time of flight, and analyzing a position of the object and a shape of the object.

* * * * *